Figure 1:
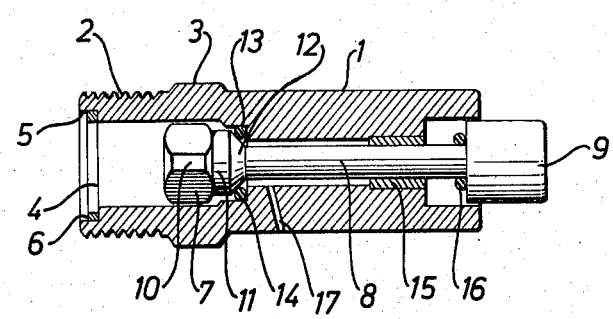

United States Patent
Olde

[11] 3,786,785
[45] Jan. 22, 1974

[54] WATERING VALVE

[76] Inventor: Jarl Rune Olde, Laduagen 4, Uppsala, Sweden

[22] Filed: Oct. 2, 1972

[21] Appl. No.: 294,372

[30] Foreign Application Priority Data
Sept. 30, 1971 Sweden.............................. 12410/71

[52] U.S. Cl................................. 119/75, 119/51.5
[51] Int. Cl............................................ A01k 7/00
[58] Field of Search............................ 119/75, 51.5

[56] References Cited
UNITED STATES PATENTS
3,144,853  8/1964  Blough.................................. 119/75
3,262,424  7/1966  Hjalmarsson ......................... 119/75

FOREIGN PATENTS OR APPLICATIONS
853,105  11/1960  Great Britain....................... 119/75

*Primary Examiner*—Hugh R. Chamblee

[57] ABSTRACT

A watering valve for animals including a valve device and a water outlet to be placed above a feed trough for supplying water out over a large area of the feed in the trough. The actuable end of the valve stem being on such a distance from the water outlet that an animal cannot actuate the valve and drink of the water simultaneously.

4 Claims, 3 Drawing Figures

WATERING VALVE

This invention relates to a watering valve for animals and particularly to what is called a nose-drinker primarily intended to be used for supplying water to dry feed for pigs.

Pigs are now feeded by dry feed, a feed having a particular composition and being in the form of powder or grains which is given to the pigs in appropriate amounts. To feed up pigs on food-leavings, boiled potatoes and similar things is merely done as exceptions and never in connection with greater piggeries irrespectively of whether the object of the breeding is to obtain fattening pigs or breeding pigs.

Usually the feeding is carried out in what is called pig pens comprising small enclosures and fitted for one or more pigs. The feeding is carried out by supplying the dry feed into a chute or a trough either by manual distribution or in an automatical way. Water is thereafter added to said dry feed in the trough, also manually or automatically.

However, it is difficult to adapt the supply of water, and it has up to now been relatively expensive to install an automatically operating device, especially if some drawbacks are to be avoided. The result to be attained is namely a uniform distribution of the water out over the feed in the trough, on one hand in order to avoid raising of dust and on the other hand to obtain correct proportions between feed and water. A simple automatically operating device gives the same amount of water to each trough regardless of the amount of feed in the different troughs which amount of feed must be adapted individually to each pig and/or the number of pigs in each pen.

Several attempts have been made for supplying water to the troughs but without greater success. I.a., attempts have been made to place a shower conduit above the troughs and attempts have also been made to make use of previously known valves or drinkers. The shower conduit is relatively expensive to install and supplies the same amount of water to all the troughs over which the conduit is arranged. As it has been necessary to adapt the supply of water to the trough having the greatest need, excess water has been obtained in the other troughs which is a great drawback to be avoided. Attempts have also been made to make use of conventional valves above the different troughs but they have not been suitable for this purpose as they have not spread or distributed the water to a sufficient extent out over the feed but usually they have supplied a jet down into the feed at one location and there formed a pool, due to which fact the desired result neither then has been obtained.

Moreover, a further advantage has been obtained by the fact that the watering valve in accordance with the invention washes the back wall of the trough so that the covering of half-dried feed on this wall will no longer be present which otherwise is common. Such a half-dried feed covering has been a good substrate for bacteria and hence, it has previously been necessary to remove said covering manually, e.g., by scouring.

The present invention consists of a valving device actuated by animals, which device is called a nose-drinker, for supplying water to the feed. What is particularly characterizing this invention is clear from the attached claims.

Figure 2:
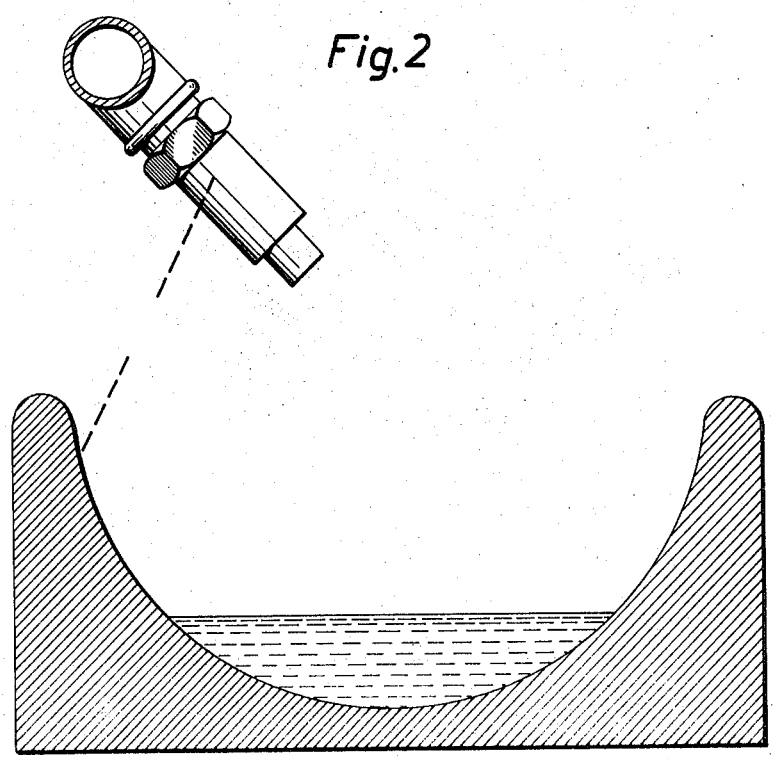
Figure 3:
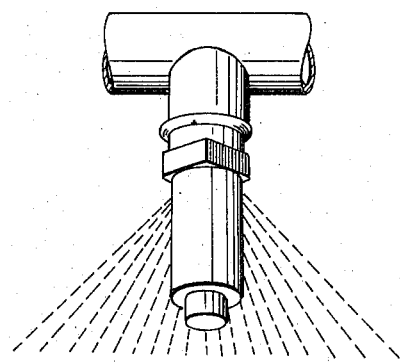

The invention is more particularly described in the following description with reference to the attached drawings in which:

FIG. 1 is a longitudinal section of a watering valve in accordance with the invention, FIG. 2 is a side view showing the watering valve in accordance with the invention situated above a feed trough, and FIG. 3 is a front view of the watering valve.

The watering valve or drinker in accordance with the invention comprises a substantially cylindrical valve body 1 having one end provided with an external thread 2 for connection with a feed water conduit. In order to facilitate the mounting the body 1 is shaped as a nut 3 adjacent to the thread 2 for a suitable tool while the rest of the body is of a generally cylindrical outer shape.

A bore is extended through the body 1 and is of different diameters and is provided with shoulders which constitute sealing surfaces and valve seats as well as guides for the valve stem and valve spool. At the water inlet end which is the threaded end of the valve body there is a filter 4 kept on place in a circumferential groove 5 by the aid of a locking ring 6. This filter is conventional and prevents small particles to go into the valve which could give rise to shut downs.

A valve spool 7 is located in the portion of the bore substantially located inside the thread 2 and the nut portion 3 and being of a relatively great diameter. From the valve spool 7 through the bore of the valve body a valve stem 8 is extended, ending with a pressure button or a head 9 intended to be actuated by the animal for opening the water supply and partially surrounded by the valve body.

The valve spool 7 has in the direction of flow a first portion 10 which can slide forward and backward in the portion of the bore previously referred to and having a great diameter and which portion 10 by bevelles or grooves permits water to pass. After said first portion 10 there is a short cylindrical portion 11 converting into a conical portion 12 constituting the part of the valve spool 7 sealingly abutting a seat in the valve body when the valve is unactuated.

The valve seat 13 comprises a shoulder or step in the conversion between the portion of the bore containing the valve spool 7 and the portion of the bore through which the valve stem 8 is extended. In order to obtain satisfactory sealing with the aid of very small forces acting on the valve spool an O-ring 14 of rubber or synthetic resilient material is placed against the shoulder 13.

Close to the outer end of the bore in the direction of flow the bore is of a slightly enlarged diameter and there is a plastic guide 15 for the guiding of the valve stem 8 in said portion said plastic guide also serving to lower the friction between the movable parts.

The outermost end of the bore in the direction of flow is of a substantially enlarged diameter and therein a portion of the head 9 is housed which head is intended to be actuated by the animal. Said head 9 can slide forward and backward in said enlarged portion of the bore but never to such an extent that it will slide out of it. This is in order to avoid that the animal gets a bite-grip on said head, and in order to make it more difficult for the pig to bite at the head 9 it extends out of the portion as little as possible without loss of the intended function.

A further O-ring 16 of the same kind as previously mentioned is arranged around the valve stem 8 against the head 9. Said O-ring serves as a sealing between the head and the valve body when the valve is in open position so that water is not delivered in an incorrect way.

A water outlet is arranged in the valve body 1 between the valve seat 13 and the O-ring 16. In the embodiment shown in the drawings it is shaped as a slit 17 the width and extension of which is made in agreement with the field of use. Instead of a slit the outlet can be constituted by several openings as a shower or be provided with openings shaped in a similar way.

As is clear from FIG. 2 of the drawings the nose-drinker is primarily intended to be directed forwards downwards from a location above the feed trough. The water outlet is directed in such a way that when the valve is opened water will hit the backwall of the feed trough like a curtain and will flow out over the feed giving this an even damping.

The function of the watering valve is such that when the pig with its nose forces the head 9 inward the sealing at the valve seat 13 ceases and water is flowing into the space around the valve stem 8 and out through the slit 17. Due to the sealing 16 at the head 9 water will not flow out around the head which makes it impossible for a pig to actuate the valve and to drink simultaneously. When the valve head 9 no longer is depressed the valve will close on one hand by the fact that the valve spool is slidably arranged so that the force of gravity will pull it towards closed position and on the other hand by the water pressure acting thereon. Hereby the use of a spring can be excluded which fact adds to a safe function.

In an appropriate embodiment of the watering valve it is so arranged and located that it will give a width of the water at the feed trough amounting to about 60 centimeters. In pens containing several pigs the feed trough can have a length of several meters. Then just a few watering valves in accordance with the invention are necessary to cover the whole feed trough so that an even distribution of the water over the feed is obtained.

Due to the even distribution obtained by the watering valve in accordance with the invention no dust will be given off and an appropriate amount of water is obtained for each demand as each pig itself can decide the amount of water it desires.

The backwall of the feed trough is all the time kept clean as the water is spread out over said wall and hence, blows away feed deposited on said wall. Due to this fact there is no longer a risk that half-dried feed should be left and give rise to colonies of bacteria.

The distribution obtained by the water valve in accordance with the invention makes it possible to supply a great amount of water during a very short time as the water is spread out over a very large area. If the same amount of water should be supplied by a conventional valve during the same time it should deliver a very strong jet passing deep into the feed and forming a pool which is an effect which is avoided by present invention.

What I claim is:

1. A device for supplying water for mixture with dry feed contained in an animal feeding trough having an elongated horizontally disposed receiver for the dry feed and an upwardly projecting back panel adapted to be mounted in an animal pen at an elevation affording access of the animal to the receiver for consumption of the feed therefrom, said device comprising an open-ended generally tubular body member having means at one open end thereof for securing it to a source of water supply and a passage extending axially therethrough to serve as a conduit for flow of water from said source into said trough, a valve for opening and closing said passage including a valve seat formed interiorly of said body member spaced axially from said one open end thereof and a valve member operatively associated with said valve seat having a stem extending axially through a central opening in said valve seat toward the opposite remote end of said body member, said valve stem terminating in an enlarged actuating head for the valve slidably confined in and having a portion projecting outwardly from a bore or socket provided therefor in said remote end of said body member in axial registry with said passage, said head being so proportioned relatively to its confining bore or socket as to render it incapable when pressed inwardly by the snout of the animal of being freely grasped by the animal's mouth independently of said body member, sealing means to prevent flow of water outwardly of said remote end of said body member when said valve is opened, and water discharge outlet means provided in an underside wall portion of said body member in communication with said passage for discharge of water from said device in the form of a curtain having a relatively broad area of spread extending transversely thereof, said water discharge outlet means being located at a point closely adjacent the downstream side of said valve seat and at such distance from said enlarged head of the valve stem as to preclude the animal feeding from the trough to drink water discharged from said outlet means simultaneously as its nose engages said enlarged head to press the same into valve-opening position.

2. A device as defined in claim 1 wherein said feed waterer is positionally disposed relatively to the feed trough with which it is associated with its axis oriented to impose a gravitational pull upon the valve stem operating in conjunction with the pressure of the supply water on said valve member for maintaining the valve closed and wherein said valve is opened solely by pressure of the animal's snout against said outwardly projecting actuating head of the valve stem.

3. A device as defined in claim 1 wherein said water discharge outlet means is in the form of a transversely extending segmentally-shaped slit formed in said underside wall portion of said body member.

4. A device as defined in claim 1 in combination with a feed trough having a vertically extending back wall wherein said device is positionally disposed relatively to the feed trough with its said water discharge outlet means oriented to direct said curtain of water against said back wall of said trough whereby a relatively broad area of said wall is flushed free of any residue of dry or semi-dried feed deposited thereon automatically upon each actuation of the waterer by the animal feeding from the trough.

* * * * *